United States Patent
Tiwari et al.

(10) Patent No.: US 11,533,091 B2
(45) Date of Patent: Dec. 20, 2022

(54) WIRELESS MIMO TRANSCEIVER SYSTEM IN HIGH SPEED MOBILITY AND METHOD THEREOF

(71) Applicants: Wipro Limited, Bangalore (IN); Indian Institute of Technology, Kharagpur (IN)

(72) Inventors: Shashank Tiwari, Pratapgarh (IN); Suvra Sekhar Das, Kharagpur (IN); Subhas Chandra Mondal, Bangalore (IN); Parag Aggarwal, Bengaluru (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 17/399,257

(22) Filed: Aug. 11, 2021

(65) Prior Publication Data
US 2022/0311486 A1    Sep. 29, 2022

(30) Foreign Application Priority Data
Mar. 29, 2021  (IN) .............................. 202141013968

(51) Int. Cl.
*H04L 5/00* (2006.01)
*H04B 7/0413* (2017.01)
*H04B 7/06* (2006.01)

(52) U.S. Cl.
CPC ......... *H04B 7/0615* (2013.01); *H04B 7/0413* (2013.01); *H04L 5/0023* (2013.01)

(58) Field of Classification Search
CPC .... H04B 7/0413; H04B 7/0615; H04L 5/0023
See application file for complete search history.

(56) References Cited

U.S. PATENT DOCUMENTS 10,003,487 B2    6/2018   Rakib et al.
2017/0244524 A1  8/2017   Hadani et al.
(Continued)

FOREIGN PATENT DOCUMENTS

WO    2018200577 A1    11/2018

OTHER PUBLICATIONS

Mollen, C., "High-End Performance with Low-End Hardware", 2018 Communications Systems: Analysis of Massive MIMO Base Station Receivers, 2018. 121 pages.
(Continued)

*Primary Examiner* — David B Lugo
(74) *Attorney, Agent, or Firm* — Finnegan, Henderson, Farabow, Garrett & Dunner, LLP

(57) ABSTRACT

The disclosure relates to method and system for providing a MIMO transceiver in high speed mobility. The method includes dividing, by the wireless MIMO transmitter, transmission data into a plurality of transmit chains corresponding to an antenna. The method further includes generating for the plurality of transmit chains, a Circularly Pulse Shaped Orthogonal Time Frequency Space (CPS-OTFS) time frequency signal based on a first primary parameter. Value of the first primary parameter is determined based on a first predefined algorithm. The method further includes converting for the plurality of transmit chains, the CPS-OTFS time frequency signal to a CPS-OTFS time domain signal based on at least one of a plurality of secondary parameters. A first plurality of N-point Inverse Fast Fourier Transform (IFFT) are employed on the CPS-OTFS time frequency signal. The first plurality corresponds to the number of sub-carriers and N corresponds to a set of time symbols.

7 Claims, 8 Drawing Sheets

(56) References Cited

U.S. PATENT DOCUMENTS

2017/0324601 A1    11/2017  Hadani et al.
2017/0331663 A1*  11/2017  Moradi ............. H04L 27/26534
2019/0081836 A1*   3/2019  Hadani ................. H04L 5/0023

OTHER PUBLICATIONS

Tiwari, S., et al., "Low complexity LMMSE Receiver for OTFS," in IEEE Communications Letters, vol. 23, No. 12, pp. 2205-2209, Dec. 2019, doi: 10.1109/LCOMM.2019.2945564.
Tiwari, S., et al., "Circularly pulse-shaped orthogonal time frequency space modulation," Electronics Letters, vol. 56, No. 3, pp. 157-160, Feb. 2020, doi: 10.1049/el.2019.2503.

* cited by examiner

WIRELESS MIMO TRANSCEIVER SYSTEM IN HIGH SPEED MOBILITY AND METHOD THEREOF

TECHNICAL FIELD

This disclosure relates generally to wireless Multiple Input Multiple Output (MIMO) transceivers, and more particularly to wireless multiple input MIMO transceiver system in high speed mobility and method thereof.

BACKGROUND

Ensuring a seamless connection during mobility of various User Equipment(s) (UEs) is one of a major challenge confronting practical implementation of Fifth Generation (5G) networks. Currently available wireless MIMO transceivers for communication under dynamic channel conditions and high-speed mobility (e.g., vehicle-to-vehicle and high-speed rail communication) fails to provide quality of communication as the MIMO transceivers (e.g., using rectangular pulse) have a very high out of band (OoB) radiation and contributes to high PAPR causing increased bit error rate (BER). This may impact quality of communication thus making existing MIMO transceivers unsuitable for communication under high speed mobility.

Prevalent vehicular channels are in general time-varying due to high delay and doppler spreads. New age radio communication such as 5G-new radio (5G-NR) uses multi-numerology Orthogonal frequency division multiplexing (OFDM) system to cater to different requirements such as support for higher vehicular speed scenario and high phase noise. Although, sub-carrier bandwidth in case of the 5G-NR communication may be increased to combat the doppler spread, the provision of proportional decrement of Cyclic Prefix (CP) length to retain OFDM symbol efficiency may induce interference when both the delay and the doppler spreads are significant.

Also, problem of the delay and the doppler spreads may be further aggravated by Time varying channel (TVC) conditions and use of OTFS in the MIMO transceiver tries to address this issue. However, conventional MIMO transceivers using OTFS when exposed to a Time varying channel (TVC) may suffer from inter-symbol and inter-carrier interference. Though use of matched filter-based receiver along with OTFS addresses the inter-symbol and inter-carrier interference issues, the associated computational complexity makes it impractical to realize an efficient solution.

Also, use of linear minimum mean square error (LMMSE) receiver along with OTFS in MIMO Transceiver has been suggested for better performance (as compared to matched filter receiver) in addressing interference issues due to enhanced interference cancellation capabilities of the LMMSE. However, use of the LMMSE with the OTFS in the MIMO transceiver increases need for higher computational complexity making it unsuitable for high-mobility, edge communication related applications.

The current available solutions are inadequate to address problems of the OoB radiation and the peak to average power ratio (PAPR) in conventional multi-transmitters using the OTFS which not only degrades the system performance but also increases the adjacent channel interference. Further, the conventional multi-receivers methods involve high computational complexity which are not efficient in reducing inter-symbol and inter-carrier interference significantly.

As will be appreciated, the available techniques do not address existing challenges and shortcoming for delivering seamless connection during mobility of the various UEs in the 5G networks. Thus, there is a need for a system and method for an improved MIMO transceiver that can control waveform dispersion while keeping the computational complexity within limits, making it suitable for realizing high mobility communication applications.

SUMMARY

In one embodiment, a wireless Multiple Input Multiple Output (MIMO) transmitter comprising a plurality of transmit antennas, a memory storing a plurality of primary parameters and a plurality of secondary parameters, and a controller communicatively coupled to each of the plurality of transmit antennas and the memory is disclosed. The controller is configured to divide transmission data into a plurality of transmit chains corresponding to each of the plurality of antennas. For each of the plurality of transmit chains the controller generates a Circularly Pulse Shaped Orthogonal Time Frequency Space (CPS-OTFS) time frequency signal based on a first primary parameter from the plurality of primary parameters. Value of the first primary parameter is determined based on a first predefined algorithm. Further, the controller converts for each the plurality of transmit chains, the CPS-OTFS time frequency signal to a CPS-OTFS time domain signal based on at least one of the plurality of secondary parameters. A first plurality of N-point Inverse Fast Fourier Transform (IFFT) are employed on the CPS-OTFS time frequency signal. Further, the first plurality corresponds to the number of sub-carriers and N corresponds to a set of time symbols.

In another embodiment, a wireless Multiple Input Multiple Output (MIMO) receiver comprising a plurality of receiver antennas, a memory storing a plurality of primary parameters and a plurality of secondary parameters, a controller communicatively coupled to each of the plurality of receiver antennas and the memory is disclosed. The controller is configured to transform, for each of a plurality of receive chains, a conditioned Circularly Pulse Shaped Orthogonal Time Frequency Space (CPS-OTFS) time domain signal to a CPS-OTFS time domain channel equalized signal based on a second primary parameter from the plurality of primary parameters. The second primary parameter is determined based on a second predefined algorithm. The controller converts, for each of the plurality of receive chains, the CPS-OTFS time domain channel equalized signal to a CPS-OTFS time frequency channel equalized signal by employing a first plurality of N-point Fast Fourier Transform (FFT) on CPS-OTFS time domain channel equalized signal. The first plurality corresponds to the number of sub-carriers and N corresponds to a set of time symbols. Further, the controller estimates, for each of the plurality of receive chains, a data signal from the CPS-OTFS time frequency channel equalized signal based on a first secondary parameter of the plurality of secondary parameters. The data signal corresponds to the plurality of receiver antennas.

In one embodiment, a transmission method through a wireless Multiple Input Multiple Output (MIMO) transmitter is disclosed. The wireless MIMO transmitter divides transmission data into a plurality of transmit chains corresponding to each of a plurality of antennas. The method may include using the wireless MIMO transmitter to generate, for each of the plurality of transmit chains, a Circularly Pulse Shaped Orthogonal Time Frequency Space (CPS-OTFS) time frequency signal based on a first primary parameter from a plurality of primary parameters. Value of the first primary parameter is determined based on a first predefined algorithm. The method may include using the wireless MIMO transmitter to convert, for each the plurality of transmit chains, the CPS-OTFS time frequency signal to a CPS-OTFS time domain signal based on at least one of a plurality of secondary parameters. A first plurality of N-point Inverse Fast Fourier Transform (IFFT) are employed on the CPS-OTFS time frequency signal. Further, the first plurality corresponds to the number of sub-carriers and N corresponds to a set of time symbols.

In another embodiment, a transmission method through a wireless Multiple Input Multiple Output (MIMO) receiver is disclosed. The wireless MIMO receiver transforms, for each of a plurality of receive chains, a conditioned Circularly Pulse Shaped Orthogonal Time Frequency Space (CPS-OTFS) time domain signal to a CPS-OTFS time domain channel equalized signal based on a second primary parameter from a plurality of primary parameters. A second primary parameter is determined based on a second predefined algorithm. The method may include using the MIMO receiver to convert, for each of the plurality of receive chains, the CPS-OTFS time domain channel equalized signal to a CPS-OTFS time frequency channel equalized signal by employing a first plurality of N-point Fast Fourier Transform (FFT) on CPS-OTFS time domain channel equalized signal. The first plurality corresponds to a number of sub-carriers and N corresponds to a set of time symbols. The method may further include using the MIMO receiver to estimate, for each of the plurality of receive chains, a data signal from the CPS-OTFS time frequency channel equalized signal based on a first secondary parameter of the plurality of secondary parameters. The data signal corresponds to the plurality of receiver antennas.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
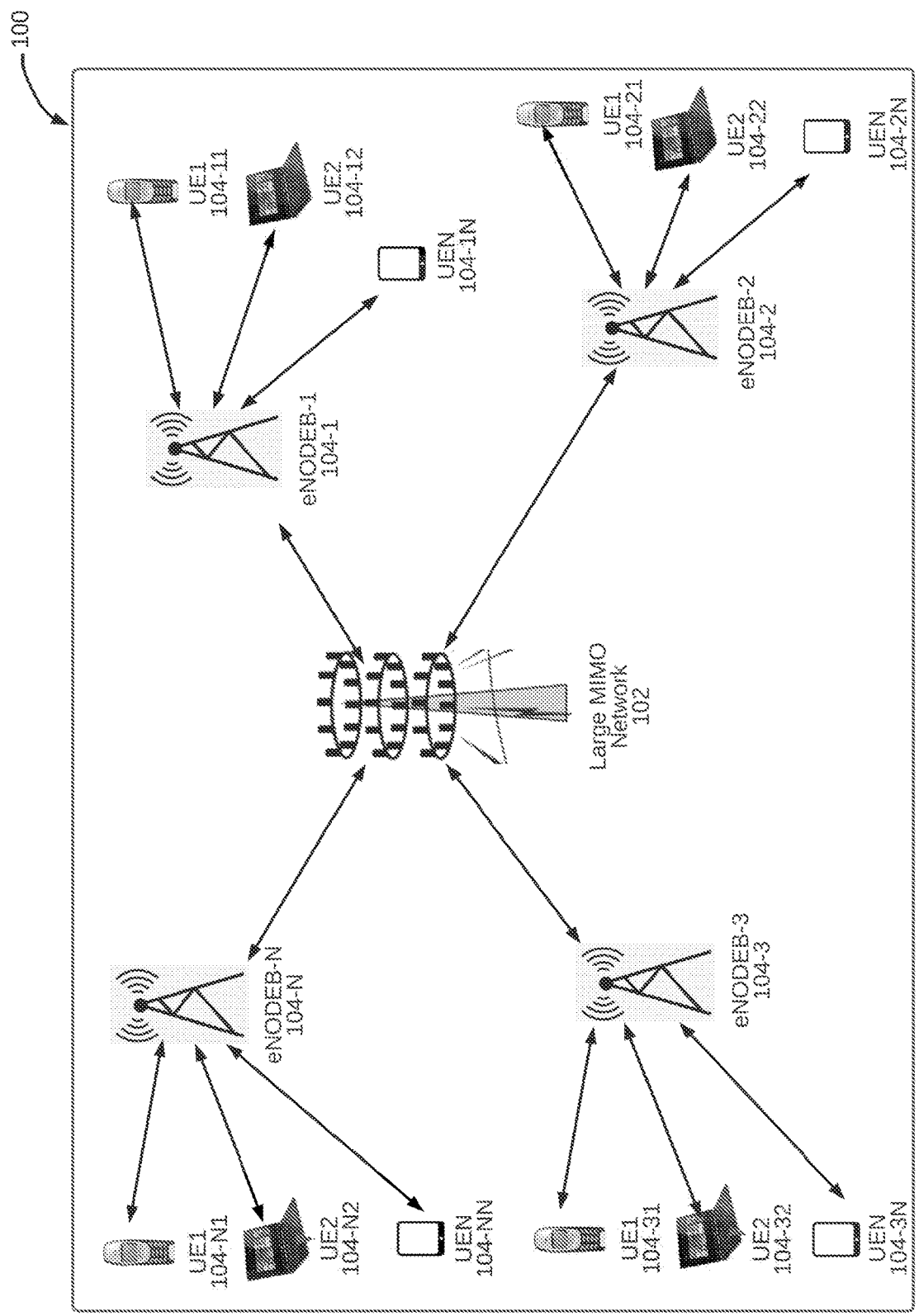
FIG. 1 illustrates an exemplary wireless MIMO transceiver system in a high speed mobility environment, in accordance with some embodiments.

Referring now to FIG. 1, an exemplary environment 100 for data transmission using wireless MIMO transceiver in high speed mobility environment is illustrated, in accordance with some embodiments of the present disclosure. In particular, the environment 100 includes a wireless MIMO transceiver 102 that is present in a large wireless Multiple Input Multiple Output (MIMO) network for fundamentally multiplying a capacity of a radio link in the network using multiple transmission and receiving antennas to exploit multipath propagation. The illustrated environment 100 facilitates to maintain a User Element's (UE's) connection via a corresponding Evolved Node B (eNodeB) with the serving wireless MIMO transceiver 102 during high movement of the UE's without any disruption.

As is illustrated, the MIMO network may comprise a MIMO transceiver 102 connected to multiple eNodeBs i.e., eNodeB 104-1, eNodeB 104-2, eNodeB 104-3, and eNodeB 104-N. Each of the multiple eNodeBs may be connected to multiple UEs, i.e., eNodeB104-1 may be connected to UE 104-11, UE 104-12, . . . UE 104-1N, eNodeB 104-2 may be connected to UE 104-21, UE 104-22, . . . UE 10-2N, eNodeB 104-3 may be connected to UE 104-31, UE 104-32, . . . UE 104-3N, and eNodeB 104-N may be connected to UE 104-N1, UE 104-N2, . . . UE 104-NN. The UEs may be such as a laptop, a mobile computing device, a tablet, a phablet, a Personal Digital Assistant (PDA), or an IoT system and so forth.

In an embodiment, the wireless MIMO transceiver 102 may operate either as a wireless MIMO transmitter or a wireless MIMO receiver. During the MIMO transceiver 102 operating in a transmitter mode, the wireless MIMO transmitter may divide transmission data into a plurality of transmit chains corresponding to each of a plurality of antennas. The wireless MIMO transmitter may generate, for each of the plurality of transmit chains, a Circularly Pulse Shaped Orthogonal Time Frequency Space (CPS-OTFS) time frequency signal based on a first primary parameter from a plurality of primary parameters. Value of the first primary parameter may be determined based on a first predefined algorithm. The plurality of primary parameters may include a Pulse Shaped Time-Frequency Coefficient (PSTFC), a Signal Correction Coefficient (SCC), and 2-Dimensional Quasi-Banded Channel Matrix (2D-QBCM). The first primary parameter may be the PSTFC.

Further, the wireless MIMO transmitter may convert, for each the plurality of transmit chains, the CPS-OTFS time frequency signal to a CPS-OTFS time domain signal based on at least one of a plurality of secondary parameters. The plurality of secondary parameters may include Prefix and Postfix Configuration Parameters (PPCP), coding and decoding related parameters, modulation and demodulation related configuration parameters, and Transmission Parameters (TP) comprising at least one of number of time symbols, transmission duration, number of sub-carriers, circulant delay value, and Doppler value.

A first plurality of N-point Inverse Fast Fourier Transform (IFFT) may be employed on the CPS-OTFS time frequency signal. The first plurality may correspond to the number of sub-carriers and N may correspond to a set of time symbols.

The wireless MIMO transmitter may insert a Cyclic Prefix (CP) to the CPS-OTFS time domain signal based on one of the plurality of secondary parameters and may transmit, via an associated transmit antenna from the plurality of transmit antennas, the CPS-OTFS time domain signal in response to inserting the CP.

The wireless MIMO transmitter may convert each of the set of time symbols within the CPS-OTFS time frequency signal into a time domain transmission signal CPS-OTFS time domain signal using the first plurality of N-point Inverse Fast Fourier Transform (IFFT).

In an embodiment, during the MIMO transceiver 102 operating in a receiver mode, the wireless MIMO receiver may transform, for each of a plurality of receive chains, a conditioned Circularly Pulse Shaped Orthogonal Time Frequency Space (CPS-OTFS) time domain signal to a CPS-OTFS time domain channel equalized signal based on a second primary parameter from a plurality of primary parameters. A second primary parameter is determined based on a second predefined algorithm.

The MIMO receiver may receive, via an associated receiver antenna from the plurality of receiver antennas, a CPS-OTFS time domain signal. The MIMO receiver may convert, for each of the plurality of receive chains, the CPS-OTFS time domain channel equalized signal to a CPS-OTFS time frequency channel equalized signal by employing a first plurality of N-point Fast Fourier Transform (FFT) on CPS-OTFS time domain channel equalized signal. The first plurality may correspond to a number of sub-carriers and N may correspond to a set of time symbols. The wireless MIMO receiver may estimate, for each of the plurality of receive chains, a data signal from the CPS-OTFS time frequency channel equalized signal based on a first secondary parameter of the plurality of secondary parameters. The data signal may correspond to the plurality of receiver antennas.

The wireless MIMO receiver may sequence, for each of the plurality of receive chains, the data signal to generate a sequenced data based on a second secondary parameter of the plurality of secondary parameters. The wireless MIMO receiver may decode, for each of the plurality of receive chains, the sequenced data to retrieve a transmitted data based on a third secondary parameter of the plurality of secondary parameters, and may provide, for each of the plurality of receive chains, the retrieved transmitted data. The plurality of secondary parameters may include Prefix and Postfix Configuration Parameters (PPCP), coding and decoding related parameters, sequencing related configuration parameters, modulation and demodulation related configuration parameters, and Transmission Parameters (TP) comprising at least one of number of time symbols, transmission duration, the number of sub-carriers, circulant delay value, channel attenuation factor, and doppler value. The first secondary parameter may correspond to the demodulation related configuration parameters, the second secondary parameter may correspond to the sequencing related configuration parameters, and the third secondary parameter may correspond to the decoding related parameters. The plurality of primary parameters may include a Pulse Shaped Time-Frequency Coefficient (PSTFC), a Signal Correction Coefficient (SCC), and 2-Dimensional Quasi-Banded Channel Matrix (2D-QBCM). The second primary parameter may be the 2D-QBCM.

The wireless MIMO receiver may remove a Cyclic Prefix (CP) attached to the CPS-OTFS time domain signal to retrieve the CPS-OTFS time domain signal. The wireless MIMO receiver may sample the CPS-OTFS time domain signal based on at least one of the plurality of secondary parameters, and may generate the conditioned CPS-OTFS time domain signal in response to sampling the CPS-OTFS time domain signal. The wireless MIMO receiver may transform the conditioned CPS-OTFS time domain signal to a CPS-OTFS time domain channel equalized signal and may include transforming the conditioned CPS-OTFS time domain signal into an intermediate state signal using backward substitution of lower triangular factorized 2D-QBCM, and transforming the intermediate state signal further using forward substitution of upper triangular factorized 2D-QBCM.

Figure 2A:
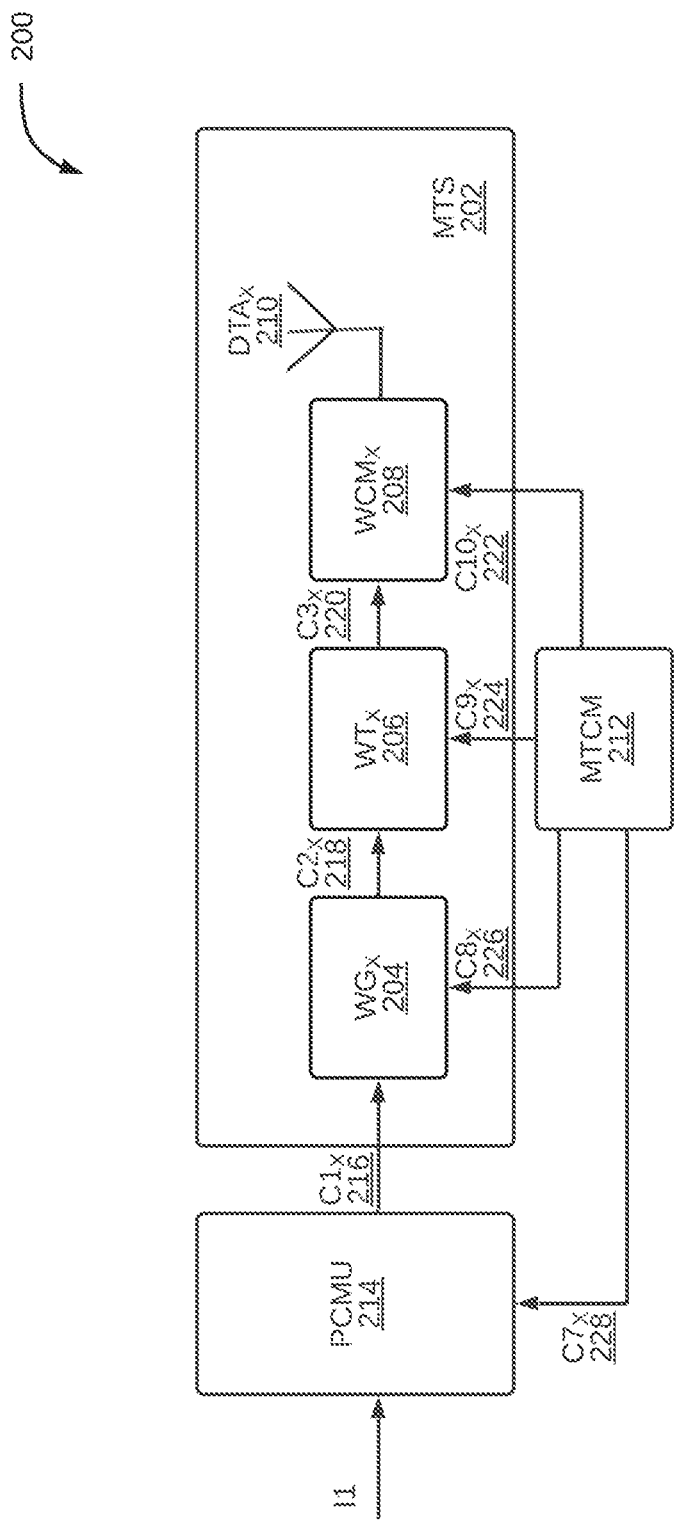
FIG. 2A illustrates an exemplary wireless MIMO transceiver operating under a transmitter mode, in accordance with some embodiments.

Referring now to FIG. 2A, an exemplary wireless MIMO transceiver 200 operating under a transmitter mode is illustrated, in accordance with some embodiments of the present disclosure. The wireless MIMO transceiver 200 of the wireless MIMO transceiver system 100 and operating under the transmitter mode may include many Multi-Transmitter Subsystems (MTS). Each of $MTS_x$ 202 of the multiple MTS may include multiple Transmit Units (TUs). A TUx of the $MTS_x$ 202 may include a corresponding Waveform Generator module ($WG_x$) 204, a Waveform Transformer module ($WT_x$) 206, and a Waveform Conditioning module ($WCM_x$) 208 along with Dedicated-Transmitter-Antennas (DTAx) 210 for signal transmission. Further, the wireless MIMO transceiver 200 may include a MIMO-Transceiver-Configuration-Module (MTCM) 212, and a Pre-coding and Mapping Unit (PCMU) 214.

Upon booting of the wireless MIMO transceiver system 100, an expected mode of operation of the wireless MIMO transceiver 200 may be determined. The MTCM 212 may determine the mode of operation either by retrieving an operating mode of the wireless MIMO transceiver 200 during last power-cycle stored in persistent memory of the wireless MIMO transceiver 200 or through a control signal. The determined mode of operation of the wireless MIMO transceiver 200 may be any of a transmitter mode (T-mode) or a receiver mode (R-Mode). The MTCM 212 may set the wireless MIMO transceiver 200 in the determined mode of operation. Further, the MTCM 212 may activate corresponding modules of the wireless MIMO transceiver 200 based on the determined mode of operation. If the determined operating mode is the T-mode, the MTCM 212 may activate the PCMU 214, the $WG_x$ module 204, the $WT_x$ module 206, and the $WCM_x$ module 208. Additionally, the MTCM 212 may store multiple primary and secondary parameters. The multiple primary parameters may include a Pulse Shaped Time-Frequency Coefficient (PSTFC), a Signal Correction Coefficient (SCC), and 2-Dimensional Quasi-Banded Channel Matrix (2D-QBCM). The multiple secondary parameters may include Prefix and Postfix Configuration Parameters (PPCP), coding and decoding related parameters, modulation and demodulation related configuration parameters, and Transmission Parameters (TP) including at least one of number of time symbols (N), transmission duration (T), number of sub-carriers (M), circulant delay value, channel attenuation factor, and Doppler value. A corresponding primary and secondary parameter may be used by wireless MIMO transceiver 200 based on the determined mode of operation. In an embodiment, when no change in a channel condition is observed, value for the PSFTC may be fixed. Upon introduction of signal distortion in a channel, changes in the channel condition may observed and may lead to a change in value of the SCC and the 2D-QBCM.

When the MIMO transceiver 200 is initialized in the transmitter mode, the MTCM 212 may determine the PSTFC using pre-set TP values and may maintain the determined PSTFC in persistent memory. These pre-set TP values may be utilized by the $WG_x$ module 204 for reducing the computational complexity.

The PCMU 214 may be connected to the MTCM 212 and to each of the $MTS_x$ 202. The PCMU 214 may receive precoding and mapping related configuration parameter from the MTCM 212. The PCMU 214 may receive transmission data (TD) as input to the MIMO transceiver during operating under the transmission mode. The PCMU 214 may perform encoding of the TD using the parameters received from the MTCM 212. The PCMU 214 may also transmit encoded data to the $MTS_x$ 202 through a connector $C1_x$ 216 based on a control signal received from the MTCM 212 through a connector $C7_x$ 228.

The connector $C1_x$ 216 may be used to send Quadrature amplitude modulation (QAMx) data by the PCMU 214 to $WG_x$ module 204 and 'x' may have values from 1 to P (i.e., number to transmitters). Further, the connector $C7_x$ 228 may be used to send control parameters from the MTCM 212 to PCMU 214. The control parameters may correspond to precoding and mapping of the transmission data.

In an embodiment, the PCMU 214 may encode input transmission data received from the interface 11 and map the encoded input transmission data to different transmit chains. The pre-coding may be used before multicarrier modulation to provide additional gains in terms of reliability or throughput in presence of multi-antennas at the MIMO transceivers. After the pre-coding of the incoming modulated data (i.e. data to be transmitted), the pre-coded data (i.e. data to be transmitted) may be mapped to the different transmit chains for realization of multiple transmitter units. As an example, each of the transmit chains ($MTS_x$ 202) may have the $WG_x$ module 204, the $WM_x$ module 206, and the $WCM_x$ module 208.

The MTCM 212 may be connected to the $WG_x$ module 204 through a connector $C8_x$, to the $WT_x$ module 206 through a connector $C9_x$, to the $WCM_x$ module 208 through a connector $C10_x$, and to the PCMU 214 through the connector $C7_x$ 228 to facilitate providing relevant configuration information depending on the operation mode of the MIMO transceiver system 100. In an example, the connector $C8_x$ 226 may be used to send the PSFTC value from the MTCM 212 to the $WG_x$ module 204, where 'x' may have values from 1 to P (i.e., number to transmitters). The distinguishing aspect may be transmission of the PSFTC value. Further, the connector $C9_x$ may be used to send configuration parameters related to waveform transformation from the MTCM 212 to the $WT_x$ module 206, where 'x' may have values from 1 to P (i.e., number to transmitters). Furthermore, the connector $C10_x$ may be used to transmit the primary configuration parameters stored in the MTCM 212 to the $WCM_x$ module 208. Here, 'x' may have values from 1 to P (i.e., number to transmitters). The connector $C10_x$ may be used to send configuration parameters related to waveform conditioning to the $WCM_x$ module 208.

In the MIMO transceiver system 100, for each of the $MTS_x$ module 202 there may be a corresponding $WG_x$ module 204. The $WG_x$ module 204 may receive an encoded transmission data from the PCMU 214 through a connector $C1_x$ 216 and may generate a waveform for the received encoded transmission data. The $WG_x$ module 204 may also receive the PSFTC value from the MTCM 212 through connector $C8_x$ 226. The MTCM 212 may use the received PSFTC value to generate a Circulant Dirichlet Pulse Shaped-Orthogonal Time Frequency Space-Time Frequency (CPS-OTFS-TF) signal. Further, a CPS-OTFS waveform may be generated corresponding to the generated CPS-OTFS-TF signal. The generated CPS-OTFS waveform may be transmitted with reduced complexity. The generated CPS-OTFS waveform may be frequency localized and may have unitary in property which may facilitate to reduce peak to average power ratio and Out of Band (OOB) radiation.

The CPS-OTFS-TF signal generated by the $WG_x$ module 204 may be received by the $WT_x$ module 206 through a connector $C2_x$ 218. As an example, the connector $C2_x$ 218 may be used to send CPS-OTFS time-frequency transmission signal (CPS-OTFS-TF-TS) by the $WG_x$ module 204 to the $WT_x$ module 206. Here, 'x' may have values from 1 to P (i.e., number to transmitters). A distinguishing aspect is transmission of the CPS-OTFS-TF-$TS_x$ through the connector $C2_x$ 218. Further, the $WT_x$ module 206 may receive transformation related configuration parameters from the MTCM 212 through a connector $C9_x$ 224. The $WT_x$ module 206 may transform the received CPS-OTFS-TF signal using transformation related configuration parameters to generate a circular pulse shaped Orthogonal Time Frequency Space (OTFS) signal in time domain. The $WT_x$ 206 module may convert every set of time symbols (N) of time-frequency domain transmission signal into time domain transmission signal using N-point IFFT. Here, 'M' number of N-point IFFTs may be required as there are 'MN' number of time-frequency domain transmission signals present in one of CPS-OTFS-TF signal. The $WT_x$ module 206 may send the transformed Circulant Dirichlet Pulse Shaped-Orthogonal Time Frequency Space-Transmission Data (CPS-OTFS-TD) signal to the $WCM_x$ module 208 through a $C3_x$ connector 220. In an example, the $C3_x$ connector may be used to send sequenced CPS-OTFS-TD-$TS_x$ from the $WT_x$ module 206 to the $WCM_x$ module 208. Here, 'x' can have values from 1 to P (i.e., number to transmitters). A distinguishing aspect here is the transmission of CPS-OTFS time domain transmission signal through the $C3_x$ connector 220. An enhancement in performance of the $WT_x$ module 206 is generation of the CPS-OTFS-TD signal by implementing M number of N-point IFFT as compared to conventional N number of M-point IFFT, where M is very high than N.

Upon receiving the CPS-OTFS-TD signal from the $WT_x$ module 206, the $WCM_x$ module 208 may condition the received CPS-OTFS-TD signal. The $WCM_x$ module 208 may insert a cyclic prefix (CP) to the received CPS-OTFS-TD signal using a pre-set CP parameter received from the MTCM 212 through a connector C10 222. The CP may act as a buffer region or as a guard interval to protect the transmitted signals from inter-symbol interference. The $WCM_x$ module 208 may transmit the CP-CPS-OTFS-TD signal through a corresponding dedicated transmit antenna (DTAx) 210. Fewer number of cyclic prefixes may be performed since a smaller number of M-point IFFT are required.

In an embodiment, when the wireless MIMO transceiver 200 operates under the transmitter mode, the MTCM 212 may determine the PSTFC as a first primary parameter for generation of a circularly pulse shaped waveform. The MTCM 212 may determine the PSTFC by using the multiple secondary parameters such as pre-set transmission parameters (TP) e.g., number of time-symbols (N), transmission duration (T) and number of sub-carriers (M). The values of the TP (e.g., M, N and T) may be stored in the persistent memory of the MTCM 212. By using the TP, the MTCM 212 may determine number of sub-carrier positions as e.g., r=N*M. Then the MTCM 212 may compute PSTFC for each 'r' represented by 'λ(r)' using M & N values of TP and 'r', and time-frequency coefficient values span from 'λ(0)' to 'λ(MN−1)'. In an example, the circularly pulse shaped time-frequency coefficient value '(λ)' may be computed as:

$$\lambda(r) = \sum_{m=0}^{N-1} g\left[mM + \left\lfloor \frac{r}{N} \right\rfloor\right] e^{j2\pi \frac{m(r \bmod N)}{M}} \qquad \text{eq. (1)}$$

Where g[n] is unitary and frequency localized pulse signal. For example, g may be a Dirichlet Pulse. Further, the MTCM 212 may store the determined PSTFC in its own persistent memory.

Figure 2B:
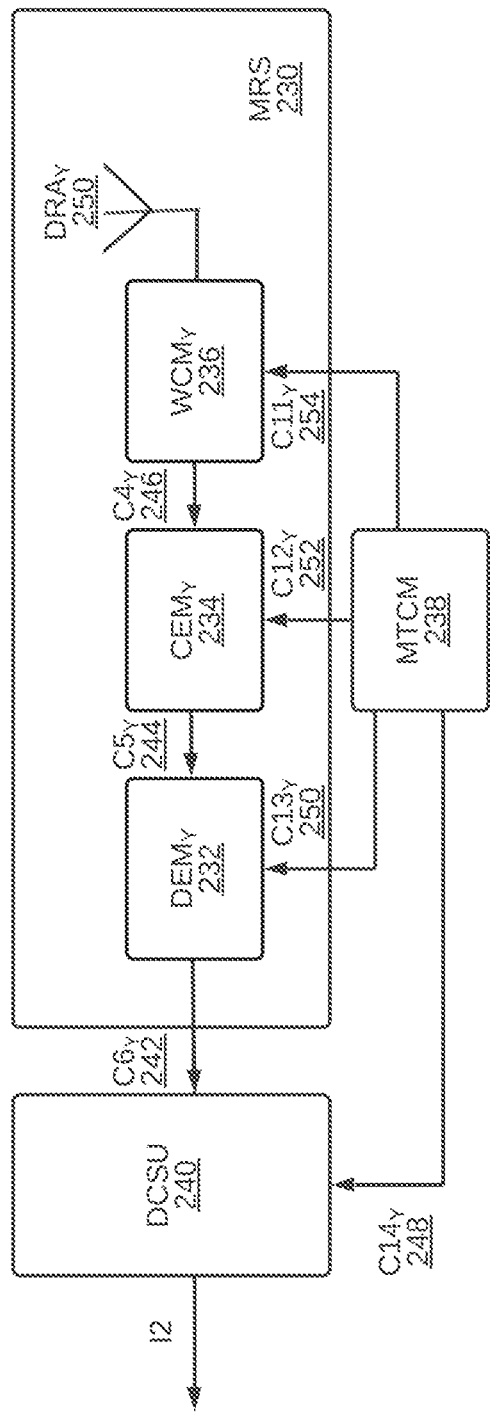
FIG. 2B illustrates an exemplary wireless MIMO transceiver operating under a receiver mode, in accordance with some embodiments.

Referring now to FIG. 2B, an exemplary wireless MIMO transceiver 200-1 operating under a receiver mode is illustrated, in accordance with some embodiments of the present disclosure. The wireless MIMO transceiver 200-1 of the wireless MIMO transceiver system 100 and operating under the receiver mode may include many Multi-Receiver Subsystems (MRS). Each of $MRS_Y$ 230 of the multiple MRS may include multiple Receiver Units (RUs). A $RU_Y$ of the $MRS_Y$ 230 may include a corresponding Waveform-Conditioning-Module ($WCM_Y$) 236, a Channel-Equalizer-Module ($CEM_Y$) 234, a Data-Estimation-Module ($DEM_Y$) 232, and a Dedicated-Receiver-Antenna ($DRA_Y$) 250 for receiving signals. Further, the wireless MIMO transceiver 200-1 may include a MIMO-Transceiver-Configuration-Module (MTCM) 238, and a Decoding and Mapping Unit (DCMU) 240.

Upon booting of the wireless MIMO transceiver system 100, an expected mode of operation of the wireless transceiver 200-1 may be determined. The determined mode of operation of the wireless MIMO transceiver 200-1 may be any of a transmitter mode (T-mode) or a receiver mode (R-Mode). The MTCM 238 may set the wireless MIMO transceiver 200-1 in the determined mode of operation. Further, the MTCM 238 may activate corresponding modules of the wireless MIMO transceiver 200-1 based on the determined mode of operation. If the determined operating mode is the R-mode, the MTCM 238 may activate the DCSU 240, the $DEM_Y$ module 232, the $CEM_Y$ module 234, and the $WCM_Y$ module 236. Additionally, the MTCM 238 may store the multiple primary and the secondary parameters. The secondary parameters may be used when the wireless MIMO transceiver 200-1 operates in the receiver operation mode. The multiple secondary parameters may include Prefix and Postfix Configuration Parameters (PPCP), coding and decoding related parameters, modulation and demodulation related configuration parameters, and Transmission Parameters (TP) including at least one of number of time symbols (N), transmission duration (T), number of sub-carriers (M), circulant delay value, channel attenuation factor, and Doppler value. First secondary parameter may correspond to the demodulation related configuration parameters, the second secondary parameter may correspond to the sequencing related configuration parameters, and the third secondary parameter may correspond to the decoding related parameters.

When the MIMO transceiver 200-1 is initialized in the receiver mode, the MTCM 238 may determine the 2D-QBCM using the pre-set values of the TP and may maintain the determined 2D-QBCM in its persistent memory. These pre-set TP values may be utilized by the $CEM_Y$ module to reduce computational complexity.

In an embodiment, the DCSU 240 may be connected the $DEM_Y$ module 232 through a connector $C6_Y$, 242 where 'Y' can have values from 1 to Q (i.e., number to receivers). The DCSU 240 may obtain decoding and sequencing related configuration parameters from the MTCM 238 through a connector C14 248. The DCSU 240 may arrange and sequence estimated data received from multiple DEM modules that correspond to each of the multiple $MRS_Y$ 230. Further, the DCSU 240 may sequence and decode estimated data to retrieve the transmission data received using $MRS_Y$ 230. Finally, the DCSU may output the decoded data through interface 12. In an example, the connector $C6_Y$ 242 may be used to send estimated data signal from the $DEM_Y$ module 232 to the DCSU 240. Here, 'Y' can have values ranging from 1 to Q (i.e., number to receivers). Further, the connector C14 248 may be used to send sequencing and decoding related configuration parameters from the MTCM 238 to the DCSU 240.

The $WCM_Y$ module 236 may receive the transmission signal from the Dedicated-Receiver-Antennas ($DRA_Y$). The $WCM_Y$ module 236 may obtain waveform conditioning related configuration parameters from the MTCM 238 through a connector $C11_Y$. The $WCM_Y$ module 236 may remove the cyclic prefix (CP) attached to the received signal (e.g., CPS-OTFS time domain signal) for retrieving a data signal. The received signal may also include noise which may be added during transmission through a time varying channel (TVC). Additionally, the received signal may be sampled at a rate based on a pre-set symbol duration and a number of sub-carriers received from the MTCM 238 through a $C11_Y$ connector 254. The $WCM_Y$ module 236 may send the conditioned signal to $CEM_Y$ module 234 through a connector $C4_Y$246. In an example, the connector $C4_Y$246 may be used to send Wireless Communication Signal (WCS) from the $WCM_Y$ module 236 to the $CEM_Y$ module 234. Here, 'Y' may have values from 1 to Q (number to receivers). Further, the $C11_Y$ connector 254 may be used to send configuration parameters from the MTCM 238 to the $WCM_Y$ module 236. Here, 'Y' may have values from 1 to Q (i.e., number to receivers). Also, the $C11_Y$ connector 254 may be used to send configuration parameters related to waveform conditioning.

The $CEM_Y$ module 234 may be connected to the $WCM_Y$ module 236, the $DEM_Y$ module 232, and the MTCM 238. The $CEM_Y$ module 234 may receive conditioned waveform from the $WCM_Y$ module 236 through the connector $C4_Y$246. The $CEM_Y$ module 234 may also obtain 2D-QBCM from the MTCM 238. The $CEM_Y$ module 234 may transform the conditioned waveform using the 2D-QBCM. This may be performed using a step-wise backward substitution and forward substitution for quasi-banded signal correction factor. The $CEM_Y$ module 234 may transform the received signal into an intermediate state using the backward substitution of lower triangular factorized 2D-QBCM. The intermediate state signal may further be transformed using a forward substitution of upper triangular factorized 2D-QBCM. As may be appreciated, purpose of the $CEM_Y$ module 234 may be to remove the channel effects which may be present in the received signal because of the time varying channel (TVC). Output of the $WCM_Y$ module 236 may be an input for the $CEM_Y$ module 234. Additionally, the $CEM_Y$ module 234 may further include linear minimum mean square error equalizer for cancelling channel effects from the received signal that facilitates to estimate data symbols. In an aspect, the $CEM_Y$ module 234 may enable generation of a channel equalized received signal ($CE-RS_Y$) by transforming the time domain received waveform using 2D-QBCM determined by the MTCM 238 thereby significantly reducing complexity of the receiver as compared to conventional LMMSE receiver.

In an embodiment, the $DEM_Y$ module 232 may be connected to the $CEM_Y$ module 234, the DCSU 240, and the MTCM 238. The $DEM_Y$ module 232 may receive Channel Equalized Received Signal ($CE-RS_Y$) from the $CEM_Y$ module 234 through a connector $C5_Y$ 244 and OTFS match filter coefficients (i.e., demodulation related configuration parameter) and transmission parameters (i.e., values of M & N) from the MTCM 238 through a connector $C13_Y$ 250. In an example, the connector $C5_Y$244 may be used to send Circularly Pulse Shaped-Orthogonal Time Frequency Space time domain Channel Equalized Signal (CPS-OTFS-TD-CES) from the $CEM_Y$ module 234 to the $DEM_Y$ module 232. Here, 'Y' may have values from 1 to Q (i.e., number to receivers). Further, the connector $C13_Y$ 250 may be used to send configuration parameters from the MTCM 238 to the $DEM_Y$ module 232. Here, 'Y' may have values from 1 to Q (i.e., number to receivers). The configuration parameters may facilitate to perform signal demodulation. The $DEM_Y$ module 232 may perform signal demodulation and signal transformation (i.e., time to frequency transformation) Finally, the $DEM_Y$ module 232 may estimate/recover the transmitted data symbols using an Orthogonal Time Frequency Space (OTFS) matched filter where parameters may be received from the MTCM 238.

Additionally, the $DEM_Y$ module 232 may transform an incoming time domain Channel Equalized Received Signal ($T-CE-RS_x$) to time frequency domain Channel Equalized Received Signal ($TF-CE-RS_x$). This transformation may be done by converting finite sequence of samples of the time domain signal into a same length sequence of samples of the frequency domain signal. Also, the transformation may be performed by using 'M' number of N-point FFT. In the end, the transmitted data may be estimated by using the OTFS matched filter. As may be appreciated, the $DEM_Y$ module 232 may enable implementation of 'M' number of N-point FFT to transform time domain $CE-RS_x$ to time-frequency domain $CE-RS_x$ as compared to conventional 'N' number of M-point FFT, where 'M' is extremely high than 'N'.

In an embodiment, when the wireless MIMO transceiver 200-1 operates under the receiver mode, the MTCM 238 may determine signal correction coefficient (SCC) for transforming the received signal (RS). The MTCM 238 may determine the SCC based on the transmission parameters (TP) stored in its own persistent memory. The TP parameters may be such as circulant delay value, channel attenuation factor, Doppler value for each of the received paths, signal power and noise variance. As the received RS is in time domain, the SCC may also vary with time. To reduce the receiver's complexity, the MTCM 238 may determine a 2-dimensional (e.g., time and frequency based) signal correction matrix (SCM) which may represent each element as the SCC. Further, the SCM may be decomposed into 2-dimensional quasi-banded channel matrix (2D-QBCM) with lower and upper factorization.

The MTCM 238 may determine the 2D-QBCM by circular shifting of channel attenuation factor and 2D-Doppler-matrix (2D-DM). The MTCM 238 may determine the 2D-DM by arranging doppler values on diagonal of a MN×MN zero matrix. Further, the MTCM 238 may decompose the 2D-QBCM such that combined (i.e., product) value of the decomposed 2D-QBCM may be equivalent to the 2D-QBCM. The purpose of this factorization is to generate low complexity values having retained the original SCC. As an example, the MTCM 238 may determine the 2D-QBCM using a LU matrix decomposition (i.e., product of a lower triangular matrix and an upper triangular matrix). The MTCM 238 may store the 2D-QBCM in its own persistent memory and may send the 2D-QBCM to the Channel-Equalizer-Module ($CEM_Y$) through the $C12_Y$ connector. In an embodiment, the MTCM 238 may store the configuration parameters and the determined transceiver configuration parameters in its own persistent memory.

Figure 3:
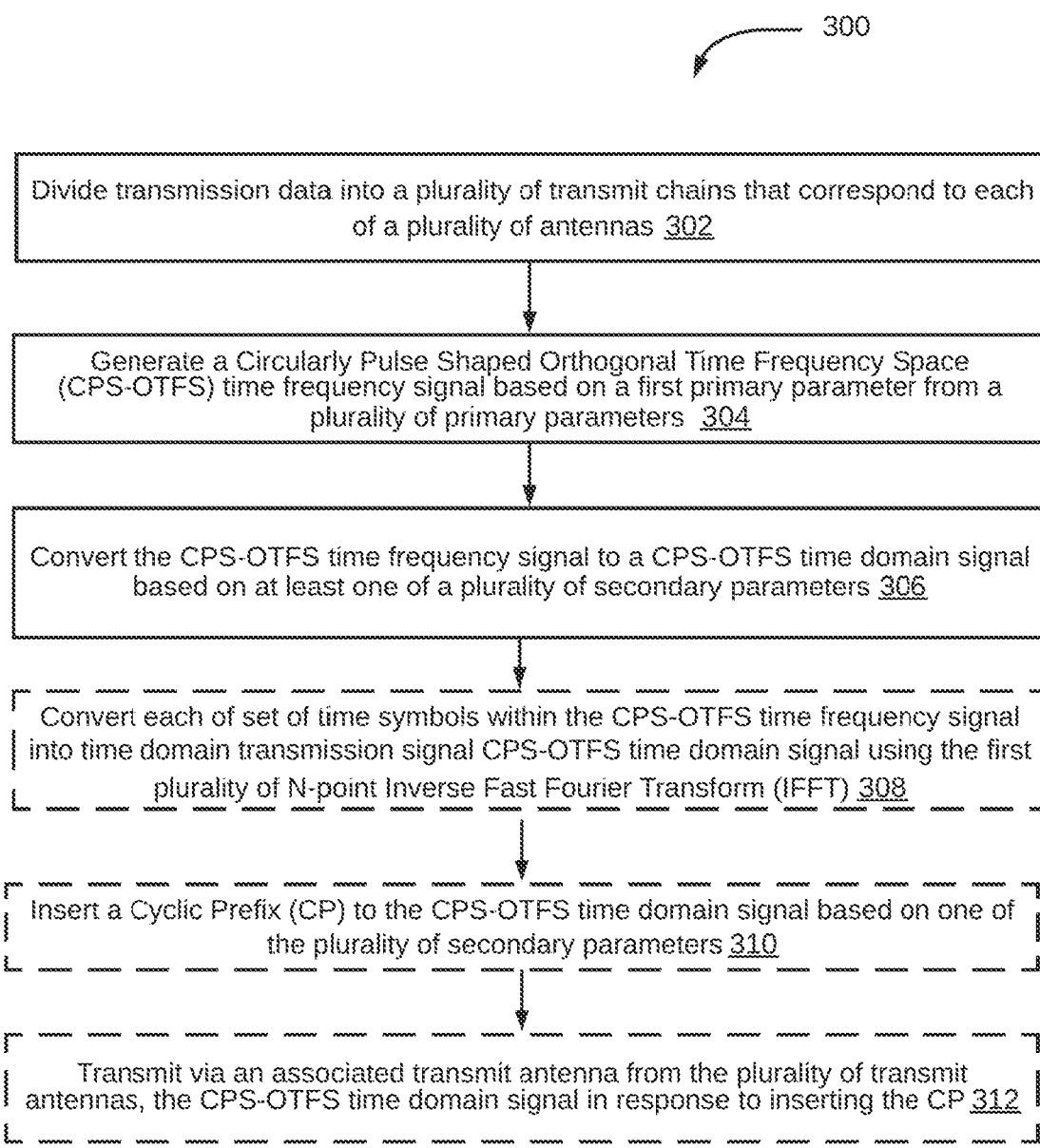
FIG. 3 illustrates a functional flow diagram of an exemplary process for data transmission through a wireless MIMO transmitter, in accordance with some embodiments.

Referring now to FIG. 3, a functional flow diagram 300 of an exemplary process for data transmission through a wireless MIMO transmitter is depicted via a flowchart, in accordance with some embodiments of the present disclosure. At step 302, the wireless MIMO transmitter may divide transmission data into multiple transmit chains that correspond to each of multiple antennas. For example, the PCMU 214 may map the transmission data to multiple different transmit chains. The PCM 214 may perform distribution of the transmission data (i.e., QAM data) into multiple transmit chains that correspond to multiple different transmit units (TUs) of the MTS. The QAM data for a specific MTS-TUx may be represented as QAMx.

At step 304, the wireless MIMO transmitter may generate for each of the multiple transmit chains a CPS-OTFS time frequency signal based on a first primary parameter from multiple primary parameters. In an example, $WG_x$ module 204 may obtain PSTFC values λ(r) from the MTCM 212 using the $C8_x$ connector 226. The $WG_x$ module 204 may obtain a portion of the QAM data identified for a specific transmitter from the PCMU 214 through the $C1_x$ connector 216. This proportion of the QAM data may be represented as QAMx. The $WG_x$ module 204 may generate a circular pulse shaped time-frequency domain transmission signal ($CPS-OTFS-TF-TS_x$) corresponding to the QAMx data symbols by scaling the QAMx data symbols using the PSTFC values λ(r). The generated $CPS-OTFS-TF-TS_x$ may be unitary and frequency localized as the PSTFC values are unitary and frequency localized. The generation of $CPS-OTFS-TF-TS_x$ may have a log-linear order of complexity. Further, the $CPS-OTFS-TF-TS_x$ may be sent to $WT_x$ module 206 using the $C2_x$ connector 218.

In an embodiment, value of the first primary parameter may be determined based on a first predefined algorithm. The multiple primary parameters may include a Pulse Shaped Time-Frequency Coefficient (PSTFC), a Signal Correction Coefficient (SCC), and 2-Dimensional Quasi-Banded Channel Matrix (2D-QBCM). The first primary parameter may be the PSTFC. Also, the multiple secondary parameters may include Prefix and Postfix Configuration Parameters (PPCP), coding and decoding related parameters, modulation and demodulation related configuration parameters, and Transmission Parameters (TP) including at least one of number of time symbols, transmission duration, number of sub-carriers, circulant delay value, and Doppler value.

At step 306, the wireless MIMO transmitter may convert for each of the multiple transmit chains, the CPS-OTFS time frequency signal to a CPS-OTFS time domain signal based on at least one of multiple secondary parameters. A first plurality of N-point Inverse Fast Fourier Transform (IFFT) may be employed on the CPS-OTFS time frequency signal. The first plurality may correspond to the number of sub-carriers and N may correspond to a set of time symbols. In an embodiment, the $WT_x$ module 206 may obtain the CPS- OTFS-TF-TS$_x$ from the WG$_x$ module 204 through the C2$_x$ connector 218. The WT$_x$ module 206 may obtain waveform transformation related parameters from the MTCM 212 through the connector C9$_x$ 224. In an example, the waveform transformation related parameters obtained may be such as transmission duration (T), time symbols (N), number of sub-carriers (M).

At step 308, each of a set of time symbols within the CPS-OTFS time frequency signal may be converted into a time domain transmission signal CPS-OTFS time domain signal using the first plurality of N-point Inverse Fast Fourier Transform (IFFT). The WT$_x$ module 206 may transform the CPS-OTFS-TF-TS$_x$ into the CPS time domain transmission signal (CPS-OTFS-TD-TS$_x$) for transmission. The transformation may be done by converting a finite sequence of samples of the frequency domain signal into a same length sequence of samples of a time domain signal. Additionally, the transformation may be done by performing an IFFT operation with log-linear order of complexity.

The WT$_x$ module 206 may convert every set of time symbol (N) of time-frequency domain transmission signal into a time domain transmission signal using M number of N-point IFFTs. The M number of N-point IFFTs may be required as there are a total MN number of time-frequency domain transmission signals present in one CPS-OTFS symbol. The WT$_x$ module 206 sequenced CPS-OTFS-TD-TS$_x$ from M number of N-point-IFFT may generate sequenced CPS-OTFS-TD-TS$_x$ corresponding to data to be transmitted. The disclosure may facilitate to generate the CPS-OTFS-TD transmission signal by implementing M number of N-point IFFT as compared to conventional N number of M-point IFFT, where M is exceedingly higher than N. Further, the sequenced CPS-OTFS-TD-TS$_x$ may be transmitted to WCM$_x$ module 208 through the C3$_x$ connector 220.

At step 310, a Cyclic Prefix (CP) may be inserted to the CPS-OTFS time domain signal based on one of the multiple secondary parameters. The WCM$_x$ module 208 may add prefix and postfix values into a time-domain transmission signal. The WCM$_x$ module 208 may obtain sequenced CPS-OTFS-TD-TS$_x$ from the WT$_x$ module 206 through the C3$_x$ connector 220. The WCM$_x$ module 208 may obtain prefix and postfix configuration parameters (PPCP) from the MTCM 212 through the connector C10$_x$ 222. The WCM$_x$ module 208 may add cyclic prefix (CP) to the sequenced CPS-OTFS-TD-TS$_x$ using the PPCP. The cyclic prefix may act as a buffer region or as a guard interval to protect the transmitted signals from inter-symbol interference.

At step 312, in response to inserting the CP, the CPS-OTFS time domain signal may be transmitted via an associated transmit antenna from the plurality of transmit antennas.

Figure 4:
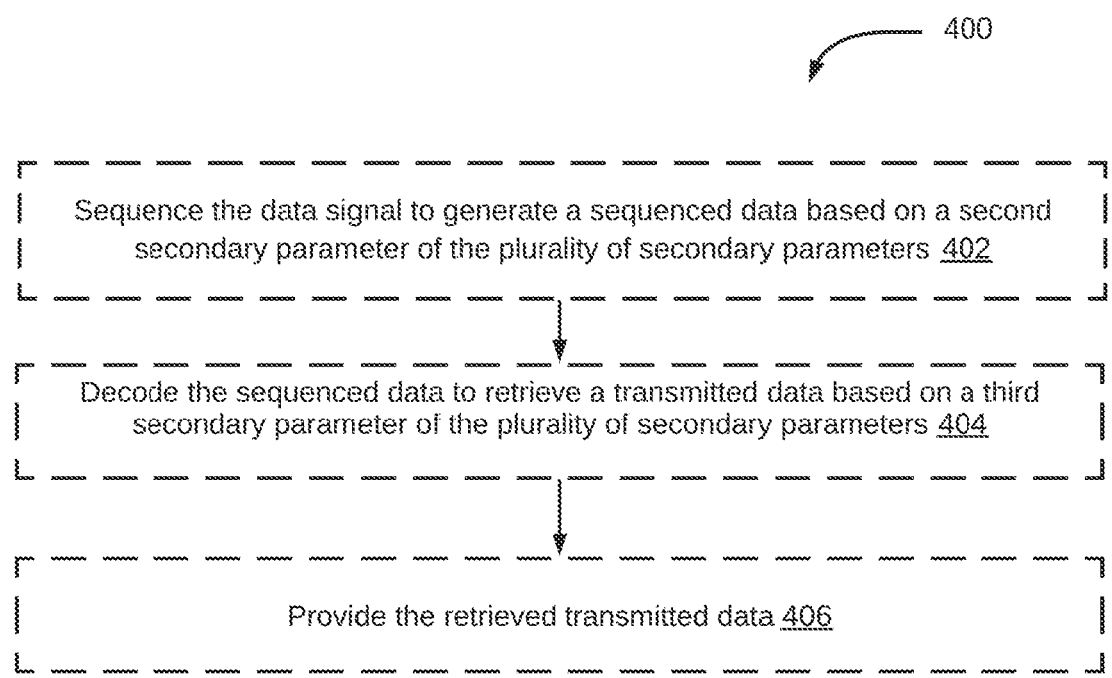
FIG. 4 illustrates a functional flow diagram of an exemplary process for decoding receive chains to provide transmitted data through a wireless MIMO receiver, in accordance with some embodiments.

Referring now to FIG. 4, a functional flow diagram 400 of an exemplary process for decoding receive chains to provide transmitted data through a wireless MIMO receiver is depicted via a flowchart, in accordance with some embodiments of the present disclosure. At step 402, the wireless MIMO receiver may sequence for each of the plurality of receive chains, the data signal to generate a sequenced data based on a second secondary parameter of the plurality of secondary parameters. As an example, the second secondary parameter may correspond to sequencing related configuration parameters. In an embodiment, the DCSU 240 may identify decoded data stream received from multi-receivers. The DCSU 240 may obtain an estimated data signal from the DEM$_Y$ module 232 of multiple Multi-Receiver-Subsystem (MRS).

At step 404, the wireless MIMO receiver may decode for each of the plurality of receive chains, the sequenced data to retrieve a transmitted data based on a third secondary parameter of the plurality of secondary parameters. As an example, the third secondary parameter may correspond to the decoding related parameters. The DCSU 240 may obtain sequencing and decoding related configuration parameters from the MTCM 238. Further, the DCSU 240 may sequence and decode the estimated data to obtain the transmitted data. The estimated data may first be sequenced using sequencing related configuration data received from the MTCM 238. Further, the sequenced data may be decoded to retrieve the transmitted data.

At step 406, the wireless MIMO receiver may provide for each of the plurality of receive chains, the retrieved transmitted data. The DCSU 240 may output the retrieved transmitted data through the 12 interface.

Figure 5:
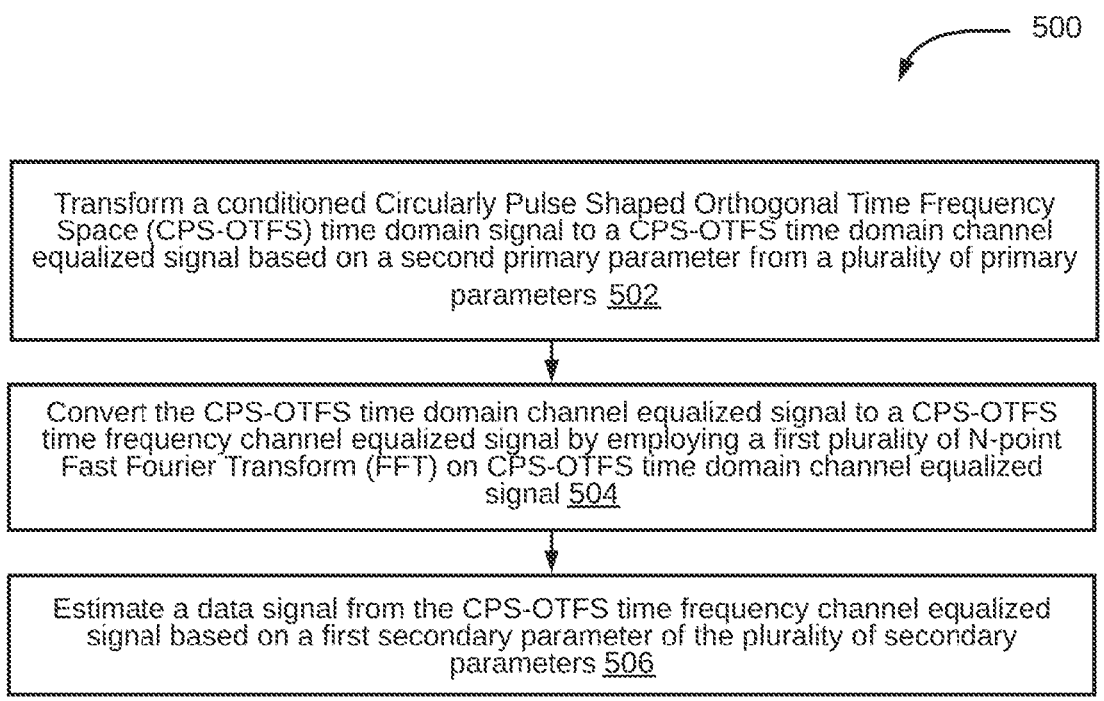
FIG. 5 illustrates a functional flow diagram of an exemplary process for transmission through a wireless MIMO receiver, in accordance with some embodiments.

Referring to FIG. 5, a functional flow diagram 500 of an exemplary process for transmission through a wireless MIMO receiver is depicted via a flowchart, in accordance with some embodiments of the present disclosure. At step 502, the wireless MIMO receiver may transform for each of a plurality of receive chains, a conditioned Circularly Pulse Shaped Orthogonal Time Frequency Space (CPS-OTFS) time domain signal to a CPS OTFS time domain channel equalized signal (CPS-OTFS-TD-CES) based on a second primary parameter from a plurality of primary parameters.

The DEM$_Y$ module 232 may obtain the CPS-OTFS-TD-CES from the CEM$_Y$ module 234 through the C5$_Y$ connector 244. The DEM$_Y$ module 232 may obtain OTFS match filter coefficient from the MTCM through the C13$_Y$ connector 250.

At step 504, for each of the plurality of receive chains, the wireless MIMO receiver may convert the CPS-OTFS time domain channel equalized signal to a CPS-OTFS time frequency channel equalized signal by employing a first plurality of N-point Fast Fourier Transform (FFT) on CPS-OTFS time domain channel equalized signal. The DEM$_Y$ module 232 may transform the CPS-OTFS-TD-CES to CPS-OTFS-TF-CES. DEM$_Y$ module 232 may convert finite sequence of samples of the CPS-OTFS-TD-CES into a same length sequence of samples of frequency domain signal. This transformation may be done by implementing an N-point FFT.

At step 506, the wireless MIMO receiver may estimate for each of the plurality of receive chains, a data signal from the CPS-OTFS time frequency channel equalized signal based on a first secondary parameter of the plurality of secondary parameters, e.g., the first secondary parameter may correspond to demodulation related configuration parameters. The DEM$_Y$ module 232 may estimate the data signal by implementing an Orthogonal Time Frequency Space (OTFS) match filter on the CPS-OTFS-TF-CES. Subsequently, the DEM$_Y$ module 232 may send the estimated data signal to The DCSU 240 through the C6$_Y$ connector 242.

Figure 6:
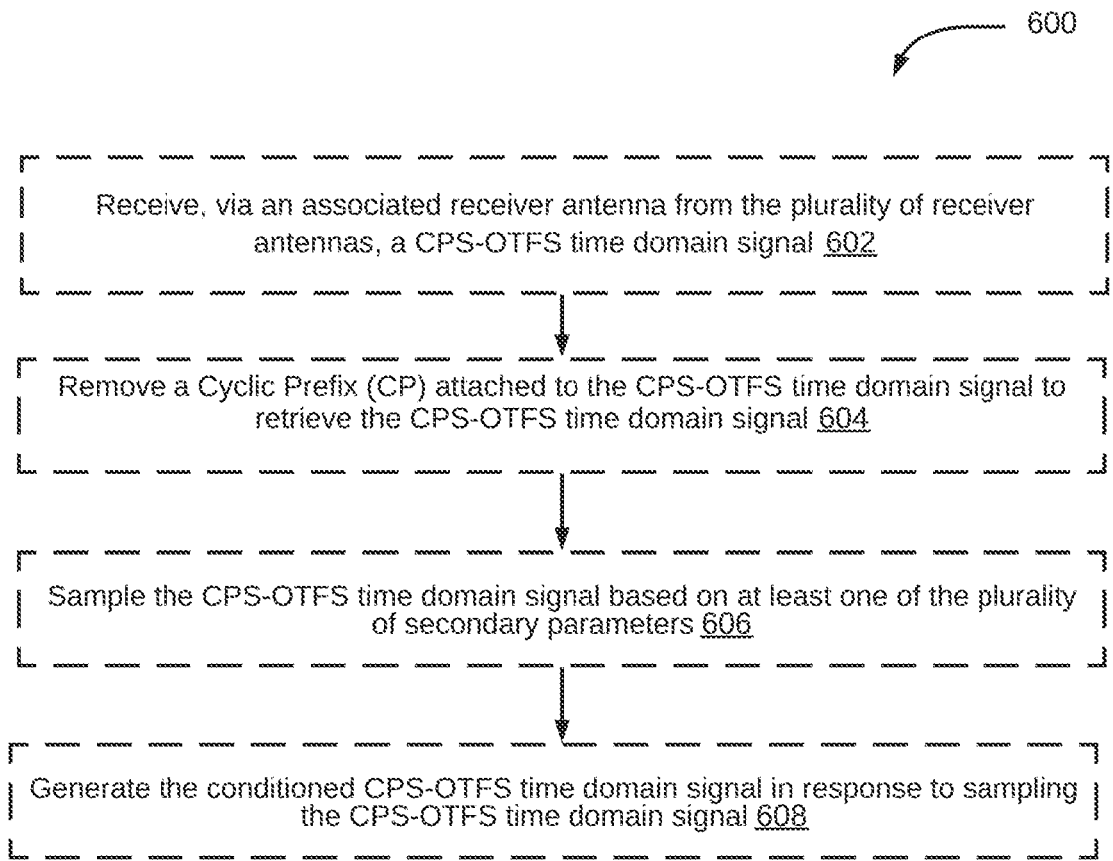
FIG. 6 illustrates a functional flow diagram of an exemplary process for generating conditioned CPS-OTFS time domain signal, in accordance with some embodiments.

Referring now to FIG. 6, a functional flow diagram 600 of an exemplary process for generating conditioned CPS-OTFS time domain signal is depicted via a flowchart, in accordance with some embodiments of the present disclosure. At step 602, the wireless MIMO receiver may receive via an associated receiver antenna, from the plurality of receiver antennas, a CPS-OTFS time domain signal. The WCM$_Y$ module 236 may obtain RS from Dedicated Receiver Antenna (DRA$_Y$). The WCM$_Y$ module 236 may obtain the PPCM and the TP from the MTCM 238 through the C11$_Y$ connector 254.

At step 604, the wireless MIMO receiver may remove a Cyclic Prefix (CP) attached to the CPS-OTFS time domain signal to retrieve the CPS-OTFS time domain signal. The WCM$_Y$ module 236 may remove the CP from the RS for retrieving the data signal, and the RS may include noise which may be added during transmission via time varying channel (TVC). The WCM$_Y$ module 236 may sample the RS based on the TP such as transmission duration (T) and number of sub-carriers (M). Further, the WCM$_Y$ module 236 may send the waveform conditioned signal (WCS) to the Channel-Equalizer-Module (CEM$_Y$) through the connector C4$_Y$.

At step 606, the wireless MIMO receiver may sample the CPS-OTFS time domain signal based on at least one of the plurality of secondary parameters. At step 608, the wireless MIMO receiver may generate the conditioned CPS-OTFS time domain signal in response to sampling the CPS-OTFS time domain signal.

Figure 7:
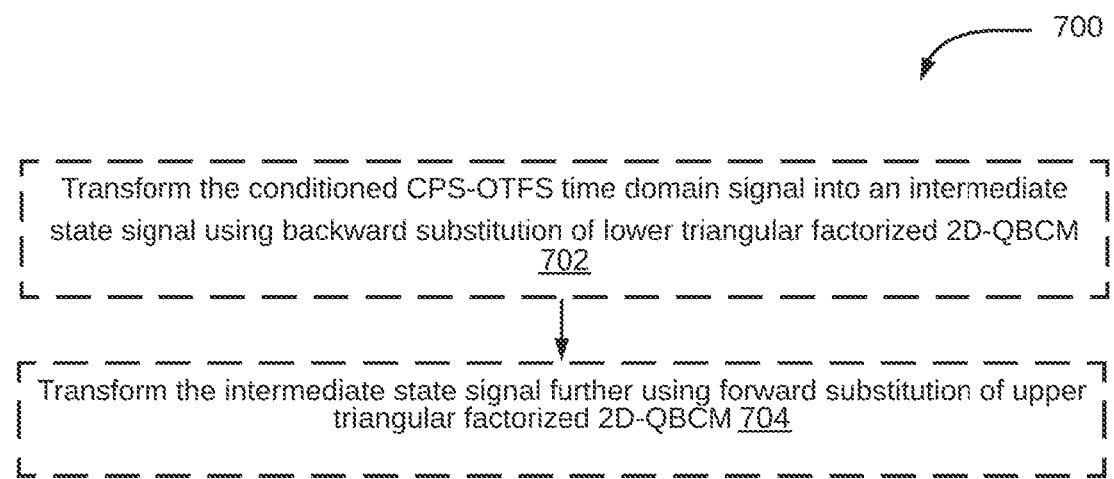
FIG. 7 illustrates a functional flow diagram of an exemplary process for transforming conditioned CPS-OTFS time domain signal, in accordance with some embodiments.

Referring now to FIG. 7, is a flow diagram 700 of an exemplary process for transforming conditioned CPS-OTFS time domain signal, in accordance with some embodiments of the present disclosure. At step 702, the wireless MIMO receiver may transform the conditioned CPS-OTFS time domain signal into an intermediate state signal using backward substitution of lower triangular factorized 2D-QBCM. At step 704, the wireless MIMO receiver may transform the intermediate state signal further using forward substitution of upper triangular factorized 2D-QBCM. The CEM$_Y$ module 234 may transform the WCS using the 2D-QBCM to determine CPS-OTFS time domain channel equalized signal (CPS-OTFS-TD-CES). The CEM$_Y$ module 234 may transform the WCS into an intermediate state using the backward substitution of lower triangular factorized 2D-QBCM. The intermediate state signal may further be transformed using a forward substitution of upper triangular factorized 2D-QBCM. Further, to equalize the channel effect, the CEM$_Y$ module 234 may perform circular shifting of the transformed WCS by a doppler delay factor. The CEM$_Y$ module 234 may further modulate the circular shifted WCS by a channel sparsity factor to determine T-CES. The CEM$_Y$ module 234 may obtain the doppler delay factor and channel sparsity factor from the MTCM 238 through the C12$_Y$ connector 252. Further, the CEM$_Y$ module 234 may send the CPS-OTFS-TD-CES to the DEM$_Y$ module 232 through the C5$_Y$ connector 244.

The disclosed methods and systems may be implemented on a conventional or a general-purpose computer system, such as a personal computer (PC) or server computer. It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide a transmission method and system through a wireless Multiple Input Multiple Output (MIMO) transmitter for dividing transmission data into a plurality of transmit chains corresponding to each of a plurality of antennas. The method and system may generate for each of the plurality of transmit chains, a Circularly Pulse Shaped Orthogonal Time Frequency Space (CPS-OTFS) time frequency signal based on a first primary parameter from a plurality of primary parameters. The value of the first primary parameter may be determined based on a first predefined algorithm. The method and system may convert, for each the plurality of transmit chains, the CPS-OTFS time frequency signal to a CPS-OTFS time domain signal based on at least one of a plurality of secondary parameters. A first plurality of N-point Inverse Fast Fourier Transform (IFFT) may be employed on the CPS-OTFS time frequency signal. Further, the first plurality may correspond to the number of sub-carriers and N corresponds to a set of time symbols.

Another embodiment of the invention provides a transmission method and system through a wireless Multiple Input Multiple Output (MIMO) receiver. The receiver may transform for each of a plurality of receive chains, a conditioned Circularly Pulse Shaped Orthogonal Time Frequency Space (CPS-OTFS) time domain signal to a CPS-OTFS time domain channel equalized signal based on a second primary parameter from a plurality of primary parameters. A second primary parameter may be determined based on a second predefined algorithm. The method and system may convert for each of the plurality of receive chains, the CPS-OTFS time domain channel equalized signal to a CPS-OTFS time frequency channel equalized signal by employing a first plurality of N-point Fast Fourier Transform (FFT) on CPS-OTFS time domain channel equalized signal. The first plurality may correspond to a number of sub-carriers and N corresponds to a set of time symbols. The method and system may estimate, for each of the plurality of receive chains, a data signal from the CPS-OTFS time frequency channel equalized signal based on a first secondary parameter of the plurality of secondary parameters. The data signal may correspond to the plurality of receiver antennas.

As will be appreciated by those skilled in the art, the techniques described in various embodiments discussed above are not routine, or conventional, or well understood in the art. Moreover, benefit of the present invention may include providing an improved wireless MIMO transceiver that has an ability to control waveform dispersion while keeping computational complexity within limits, thus making the MIMO transceiver suitable for realizing high mobility edge communication applications. This may be achieved by applying a waveform dispersion control where the transmitter may use a modulator for modulating data that is to be transmitted using CPS-OTFS in which transmitted signal waveform may be circular and spans a whole frame duration. Implementation of the CPS-OTFS may have features such as (a) implementing circularly pulse shaped OTFS to reduce peak to average power ratio, and (b) implementing frequency-localized OTFS to reduce the OOB radiation. In addition, this may be achieved by reducing computational complexity and may be executed by implementing low complexity CPS-OTFS based multi-transmitter with log-linear order of complexity for signal processing, and by implementing low complexity channel equalization of the received signal by multi-receiver using quasi-banded signal correction factor(s) derived from channel characteristics/condition. Further, the multi-receiver may transform the received signal by sequentially implementing backward and forward substitution for quasi-banded signal correction factor(s) respectively.

The specification has described method and system for data transmission. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A wireless Multiple Input Multiple Output (MIMO) receiver comprising:
   a plurality of receiver antennas;
   a memory storing a plurality of primary parameters and a plurality of secondary parameters; and
   a controller communicatively coupled to each of the plurality of receiver antennas and the memory, wherein the controller is configured to:
     transform, for each of a plurality of receive chains, a conditioned Circularly Pulse Shaped Orthogonal Time Frequency Space (CPS-OTFS) time domain signal to a CPS-OTFS time domain channel equalized signal based on a second primary parameter from the plurality of primary parameters, wherein the second primary parameter is determined based on a second predefined algorithm, and
     wherein to transform the conditioned CPS-OTFS time domain signal to the CPS-OTFS time domain channel equalized signal, the controller is further configured to:
       transform the conditioned CPS-OTFS time domain signal into an intermediate state signal using backward substitution of lower triangular factorized 2D-QBCM; and
       transform the intermediate state signal further using forward substitution of upper triangular factorized 2D-QBCM;
     convert, for each of the plurality of receive chains, the CPS-OTFS time domain channel equalized signal to a CPS-OTFS time frequency channel equalized signal by employing a first plurality of N-point Fast Fourier Transform (FFT) on CPS-OTFS time domain channel equalized signal, wherein the first plurality corresponds to the number of sub-carriers and N corresponds to a set of time symbols; and
     estimate, for each of the plurality of receive chains, a data signal from the CPS-OTFS time frequency channel equalized signal based on a first secondary parameter of the plurality of secondary parameters, wherein the data signal corresponds to the plurality of receiver antennas.

2. The wireless MIMO receiver of claim 1, wherein the controller is further configured to:
   sequence, for each of the plurality of receive chains, the data signal to generate a sequenced data based on a second secondary parameter of the plurality of secondary parameters;
   decode, for each of the plurality of receive chains, the sequenced data to retrieve a transmitted data based on a third secondary parameter of the plurality of secondary parameters; and
   provide, for each of the plurality of receive chains, the retrieved transmitted data.

3. The wireless MIMO receiver of claim 2, wherein the plurality of secondary parameters comprises Prefix and Postfix Configuration Parameters (PPCP), coding and decoding related parameters, sequencing related configuration parameters, modulation and demodulation related configuration parameters, and Transmission Parameters (TP) comprising at least one of number of time symbols, transmission duration, the number of sub-carriers, circulant delay value, channel attenuation factor, and doppler value, and
   wherein the first secondary parameter corresponds to the demodulation related configuration parameters, the second secondary parameter corresponds to the sequencing related configuration parameters, and the third secondary parameter corresponds to the decoding related parameters.

4. The wireless MIMO receiver of claim 1, wherein the controller is further configured to receive, via an associated receiver antenna from the plurality of receiver antennas, a CPS-OTFS time domain signal.

5. The wireless MIMO receiver of claim 4, wherein the controller is further configured to:
   remove a Cyclic Prefix (CP) attached to the CPS-OTFS time domain signal to retrieve the CPS-OTFS time domain signal;
   sample the CPS-OTFS time domain signal based on at least one of the plurality of secondary parameters; and
   generate the conditioned CPS-OTFS time domain signal in response to sampling the CPS-OTFS time domain signal.

6. The wireless MIMO receiver of claim 1, wherein the plurality of primary parameters comprise a Pulse Shaped Time-Frequency Coefficient (PSTFC), a Signal Correction Coefficient (SCC), and 2-Dimensional Quasi-Banded Channel Matrix (2D-QBCM), and wherein the second primary parameter is the 2D-QBCM.

7. A transmission method through a wireless Multiple Input Multiple Output (MIMO) receiver, the method comprising:
   transforming, by the wireless MIMO receiver, for each of a plurality of receive chains, a conditioned Circularly Pulse Shaped Orthogonal Time Frequency Space (CPS-OTFS) time domain signal to a CPS-OTFS time domain channel equalized signal based on a second primary parameter from a plurality of primary parameters, wherein a second primary parameter is determined based on a second predefined algorithm, and wherein the conditioned CPS-OTFS time domain signal is transformed to the CPS-OTFS time domain channel equalized signal by:
  transforming the conditioned CPS-OTFS time domain signal into an intermediate state signal using backward substitution of lower triangular factorized 2D-QBCM; and
  transforming the intermediate state signal further using forward substitution of upper triangular factorized 2D-QBCM;
converting, by the wireless MIMO receiver, for each of the plurality of receive chains, the CPS-OTFS time domain channel equalized signal to a CPS-OTFS time frequency channel equalized signal by employing a first plurality of N-point Fast Fourier Transform (FFT) on CPS-OTFS time domain channel equalized signal, wherein the first plurality corresponds to a number of sub-carriers and N corresponds to a set of time symbols; and
estimating, by the wireless MIMO receiver, for each of the plurality of receive chains, a data signal from the CPS-OTFS time frequency channel equalized signal based on a first secondary parameter of the plurality of secondary parameters, wherein the data signal corresponds to the plurality of receiver antennas.

* * * * *